(12) United States Patent
Singhal

(10) Patent No.: US 7,350,206 B2
(45) Date of Patent: Mar. 25, 2008

(54) METHOD TO REDUCE PROVISIONING TIME IN SHARED STORAGE SYSTEMS BY PREEMPTIVE COPYING OF IMAGES

(75) Inventor: Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 10/011,378

(22) Filed: Nov. 5, 2001

(65) Prior Publication Data
US 2003/0088428 A1    May 8, 2003

(51) Int. Cl.
G06F 9/445    (2006.01)
G06Q 10/00    (2006.01)

(52) U.S. Cl. .......................................... 717/176; 705/1
(58) Field of Classification Search ................. 705/400, 705/1; 717/176
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,276,867 A | * | 1/1994 | Kenley et al. | 707/204 |
| 5,566,316 A | * | 10/1996 | Fechner et al. | 711/114 |
| 5,594,910 A | * | 1/1997 | Filepp et al. | 712/28 |
| 5,696,923 A | * | 12/1997 | Robertson et al. | 711/202 |
| 5,712,976 A | * | 1/1998 | Falcon et al. | 725/115 |
| 5,758,072 A | * | 5/1998 | Filepp et al. | 709/220 |
| 5,892,914 A | * | 4/1999 | Pitts | 709/219 |
| 5,958,063 A | * | 9/1999 | Croslin et al. | 714/4 |
| 6,003,065 A | * | 12/1999 | Yan et al. | 709/201 |
| 6,016,393 A | * | 1/2000 | White et al. | 719/315 |
| 6,230,190 B1 | * | 5/2001 | Edmonds et al. | 709/213 |
| 6,243,580 B1 | * | 6/2001 | Garner | 455/428 |
| 6,895,467 B2 | * | 5/2005 | Lubbers et al. | 711/114 |
| 7,000,143 B2 | * | 2/2006 | Moulton et al. | 714/6 |
| 7,038,802 B2 | * | 5/2006 | Brady | 358/1.15 |
| 2001/0052038 A1 | * | 12/2001 | Fallon et al. | 710/68 |
| 2002/0059539 A1 | * | 5/2002 | Anderson | 714/6 |
| 2002/0093679 A1 | * | 7/2002 | Brady | 358/1.15 |

OTHER PUBLICATIONS

Mark J. Stejik et al. "Integrating Access Oriented PRogramming into a Multiparadigm Environment". IEE Software, 1986 pp. 10-18.*

* cited by examiner

Primary Examiner—John W. Hayes
Assistant Examiner—Rutao Wu

(57) ABSTRACT

A method and device for provisioning another device with an application. The golden image of the application, representing a source copy of the application, is stored at a first storage location in a central storage device. A copy of the golden image is generated prior to receiving a request for the golden image. The copy of the golden image is stored at a second storage location in the central storage device. The second storage location is mapped to a device that needs a copy of the golden image, wherein the device is operable to execute the application in communication with the central storage device. Once this device has been provisioned with the copy of the golden image, another copy is made in anticipation of another request. In this manner, the time needed to provision a device is substantially reduced.

20 Claims, 5 Drawing Sheets

METHOD TO REDUCE PROVISIONING TIME IN SHARED STORAGE SYSTEMS BY PREEMPTIVE COPYING OF IMAGES

TECHNICAL FIELD

The present invention relates to networks of devices. More specifically, the present invention pertains to data centers that execute software applications in communication with shared storage systems.

BACKGROUND ART

A data center typically includes a number of host devices (e.g., computer systems) that are usually leased to outside entities (clients) such as a business. Clients use the leased devices for any of a variety of applications, such as electronic commerce ("e-commerce") applications that can be accessed by a client's customers over the Internet, for example.

The data center operator generally has responsibility for operating and maintaining the host devices, and the host devices are usually provisioned with applications by an application vendor. This arrangement thus provides a convenient means for businesses and the like to have an Internet presence without the burden of operating, maintaining and provisioning the host devices.

In one implementation, the application used by a host device is stored on the local storage of the device. In another implementation, the application used by a host device is stored on a central storage system. For simplicity of discussion, the case in which applications are stored on the central storage system provides the context for the description below. However, the discussion below can be readily extrapolated to the implementation in which applications are stored in local storage.

The host devices in the data center are communicatively coupled to the central storage system over a high bandwidth network such as a fibre channel network. The central storage system provides storage resources that can be accessed by the host devices in the data center. The fibre channel network provides the high bandwidth needed to transfer large amounts of data and information between the host devices and the central storage system.

Each host device in the data center is allocated a portion of the storage resources provided by the central storage system. While the host devices share the storage resources of the central storage system, each device is restricted to its allocated portion of storage. From the viewpoint of a host device, each device believes it is using local storage, when in fact it is using storage located in the central storage system.

For an application vendor, setting up an application on behalf of a client can be a relatively time-consuming and complex task. For example, to set up an application for a particular client, the application has to be configured(customized) for the particular operating system used by the client, for any unique operating system parameters, and for any other client-specific parameters and attributes. The configured application is then copied into each of the storage locations associated with the client's host devices that will use the application. Next, the copies in these storage locations may each need to be further customized with device-specific parameters and attributes such as a device's IP (Internet Protocol) address.

To facilitate the process described above, an image of the application as it exists at various points in the process is stored as a "golden image." That is, a golden image of the unmodified application, not including any changes made to the application to incorporate client-specific parameters and attributes, can be stored. Similarly, a golden image of the application including client-specific parameters and attributes, but not including any changes made to the application to incorporate device-specific parameters and attributes, can be stored.

Then, to set up an application, the appropriate golden image is selected and copied, and the copy of the golden image is used as the basis for any subsequent changes. For example, if an application is needed for a new client, then the golden image for the unmodified application is selected, a copy is made, and the copy is modified as needed for the client. If a client adds a new host device, the golden image of the client-specific application is selected, a copy is made, and the copy is modified as needed for the device. As a result, the time and effort needed to configure an application for a particular client and/or device can be reduced by building on previously completed and saved work.

A problem with the process described above is that the golden images are generally large in size and so copying them can take a relatively long time. Each golden image may be several gigabytes or more in size, and an application may actually be made up of multiple golden images. Thus, it can take up to several hours to copy the golden images needed to provide an application to a client or to a host device added by a client.

Clients often have a choice of which vendor they want to provision their host devices with applications. A vendor that can provide an application to a client or that can provision additional client devices in the shortest amount of time will have a competitive advantage over other vendors.

Currently, vendors attempt to reduce provisioning time by increasing block sizes to speed up copying, by using faster networks to decrease transfer time, and the like. However, with these factors being equal, each vendor remains no faster that its competitors.

Accordingly, what is needed is a method and/or system that can reduce the time needed to provision a device with an application. The present invention provides a novel solution to the above need.

DISCLOSURE OF THE INVENTION

The present invention provides a method and system that can reduce the time needed to provision a device with an application. In one embodiment, the golden image of the application, representing a source copy of the application, is stored at a first storage location in a central storage device (e.g., a shared storage system). A copy of the golden image is generated prior to receiving a request for the golden image. The copy of the golden image is stored at a second storage location in the central storage device. The second storage location is mapped to a device (e.g., a host device in a data center) that needs the application represented by the golden image, wherein the host device is operable to execute the application in communication with the central storage device. Once this host device has been provisioned with the copy of the golden image, another copy is made in anticipation of another request.

In one embodiment, the copy of the golden image is configured according to attributes of the host device (for example, the device's Internet Protocol address can be incorporated into the image copy). In this embodiment, a copy of the copy of the golden image can also be generated and stored, wherein the copy of the copy includes the configuration changes that have been made.

In another embodiment, a prediction can be made of when requests for a copy of the golden image are expected. Based on the results of the prediction, additional copies of the golden image can be generated. The number of additional copies can depend on the expected frequency of future requests, for example.

Therefore, according to the present invention, the time needed to provision a device with an application is substantially reduced. These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
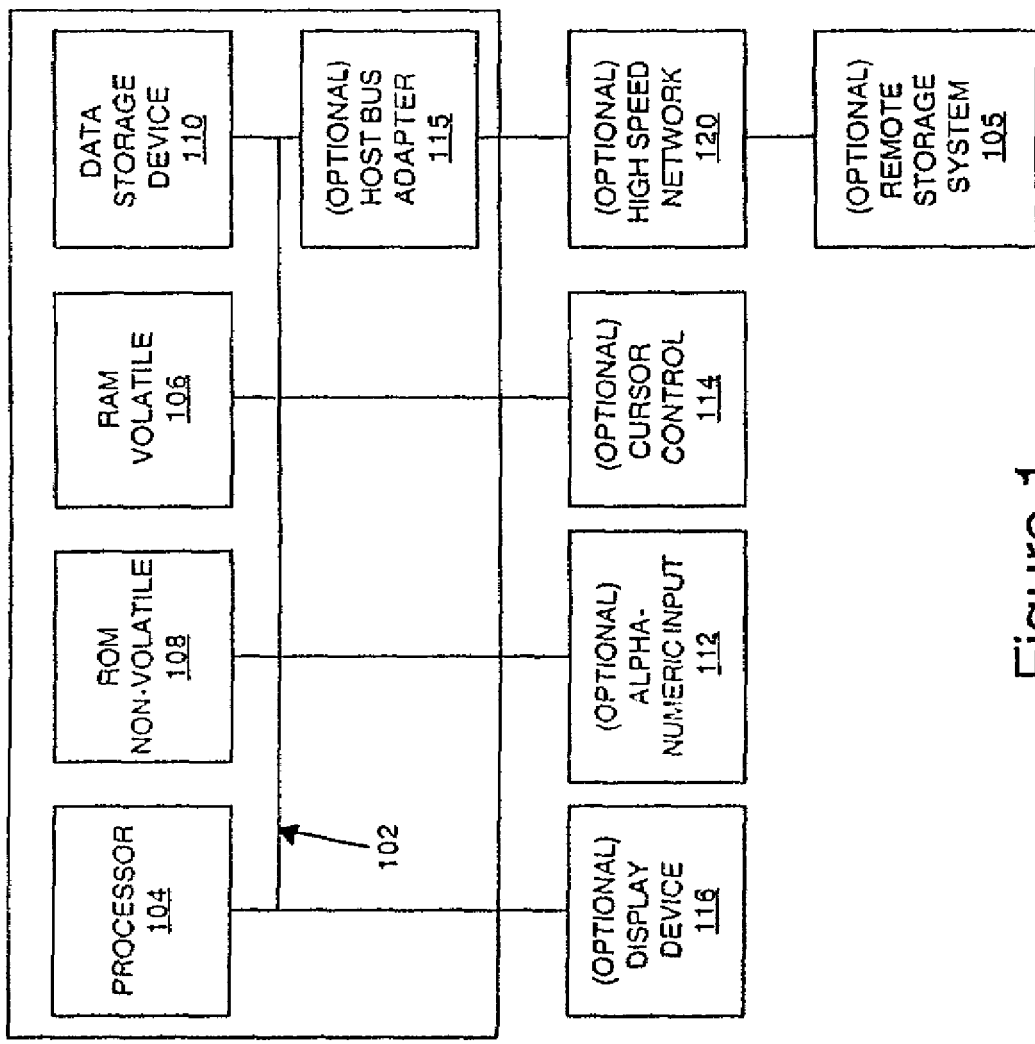
FIG. 1 is a block diagram of an exemplary computer system upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "generating," "mapping," "receiving," "configuring," "forecasting" or "determining" or "requesting" or the like, refer to actions and processes (e.g., the processes of FIGS. 4 and 5) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

With reference now to FIG. 1, portions of the present invention method and system are comprised of computer-readable and computer-executable instructions that reside, for example, in computer-usable media of a computer system. FIG. 1 illustrates an exemplary computer system 100 used in accordance with one embodiment of the present invention. It is appreciated that computer system 100 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 is well adapted having computer-readable media such as, for example, a floppy disk, a compact disc, and the like coupled thereto. Such computer-readable media is not shown coupled to computer system 100 for purposes of clarity.

Computer system 100 includes an address/data bus 102 for communicating information, and a central processor unit 104 coupled to bus 102 for processing information and instructions. Computer system 100 also includes data storage features such as a computer usable volatile memory 106, e.g., random access memory (RAM), coupled to bus 102 for storing information and instructions for central processor unit 104; computer usable non-volatile memory 108, e.g., read only memory (ROM), coupled to bus 102 for storing static information and instructions for the central processor unit 104; and a data storage unit 110 (e.g., a magnetic or optical disk and disk drive) coupled to bus 102 for storing information and instructions. Computer system 100 of the present invention also includes an optional alphanumeric input device 112 including alphanumeric and function keys coupled to bus 102 for communicating information and command selections to central processor unit 104. Computer system 100 also optionally includes an optional cursor control device 114 coupled to bus 102 for communicating user input information and command selections to central processor unit 104. Computer system 100 of the present embodiment also includes an optional display device 116 coupled to bus 102 for displaying information.

Referring still to FIG. 1, optional display device 116 may be a liquid crystal device, cathode ray tube, or other display device suitable for creating graphic images and alphanumeric characters recognizable to a user. Optional cursor control device 114 allows the computer user to dynamically signal the two-dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. Furthermore, it should be recognized that the function provided by display device 116, alphanumeric input device 112, and cursor control device 114 may be provided remotely using a remote terminal or Web browser to control computer system 100.

Continuing with reference to FIG. 1, computer system 100 may include one or more host bus adapters 115 which communicatively couple the computer system 100 to one or more remote storage devices 105 via a high speed network 120. For example, the host bus adapter 115 may be a fibre channel adapter, the high speed network 120 may be a fibre channel network, and the storage device 105 may be a central storage system (refer also to FIGS. 2 and 3, below). Additionally, the host bus adapter 115 may allow additional external disks to be coupled to computer system 100 through an external (e.g., SCSI) connector.

Figure 2:
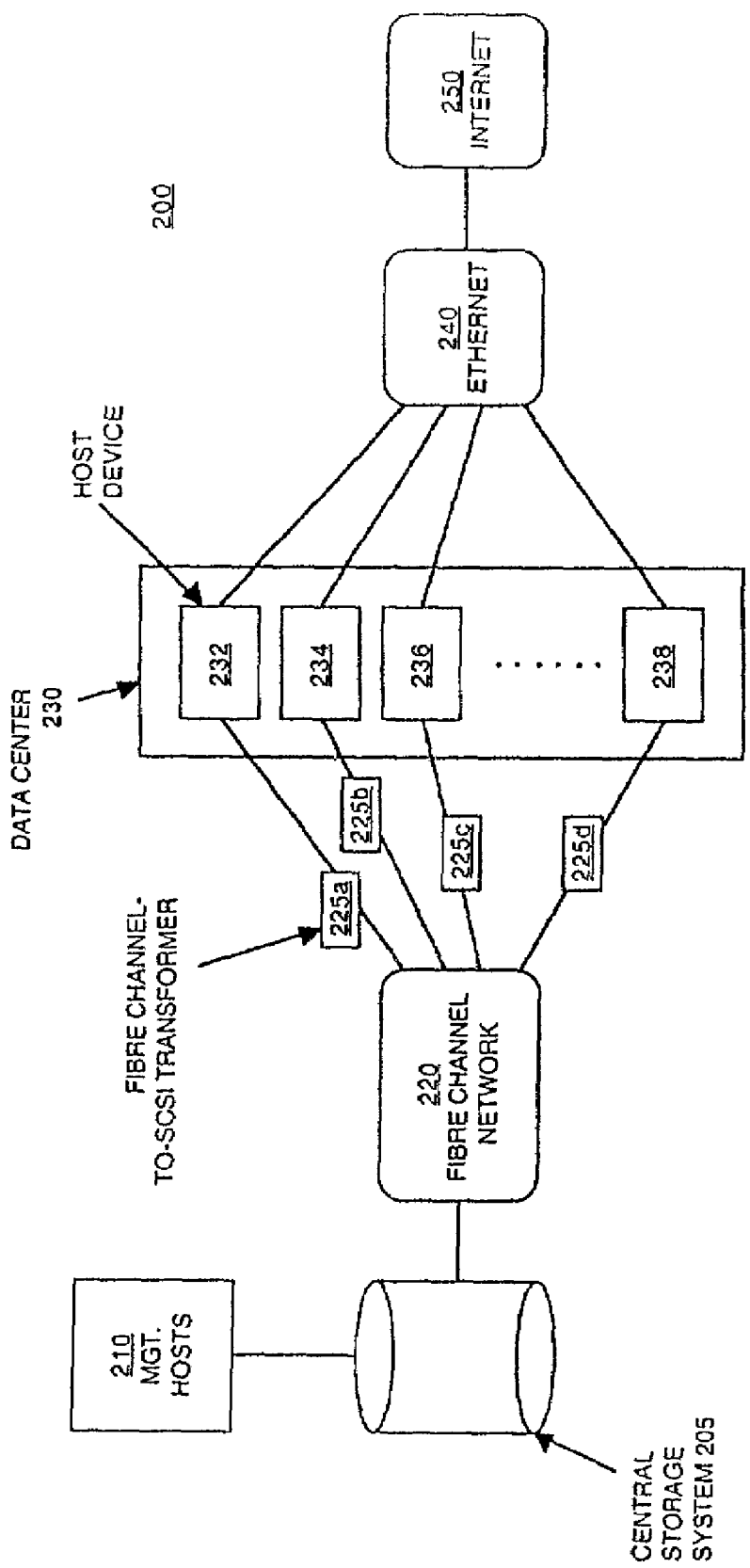
FIG. 2 is a block diagram of an exemplary network of devices upon which embodiments of the present invention may be implemented.

FIG. 2 is a block diagram of an exemplary network 200 upon which embodiments of the present invention may be implemented. In the illustrated embodiment, network 200 includes a central storage system 205 under control of a management host device 210. It is appreciated that management host device 210 and central storage system 205 may be implemented as a single device.

Central storage system 205 is communicatively coupled to data center 230 by fibre channel network 220 or by some other type of high bandwidth network. Data center 230 includes a plurality of host devices 232, 234, 236 and 238; in actuality, a data center may include several hundred (e.g., 300-700) host devices. The host devices 232, 234, 236 and 238 and the management host device 210 may each be exemplified by computer system 100 of FIG. 1.

Continuing with reference to FIG. 2, each of the host devices 232, 234, 236 and 238 is coupled to fibre channel network 220 by a fibre channel-to-SCSI transformer (or connector) 225a-225d, respectively. The host devices 232, 234, 236 and 238 can alternatively be coupled directly to the fibre channel network 220 through host bus adapters. The data center 230 is coupled to an Ethernet or Local Area Network 240, which in turn is coupled to the Internet 250.

It is appreciated that the present invention can be implemented on network configurations different from the configuration illustrated in FIG. 2. It is also appreciated that other network configurations may include devices different from those included in network 200.

In the present embodiment, the host devices 232, 234, 236 and 238 in data center 230 each execute an application, such as but not limited to an electronic commerce (e-commerce) application. The host devices in data center 230 (and the applications executed by the host devices) are directly or indirectly accessible by external users via the Internet 250 and Ethernet 240. In one embodiment, the application executed by a host device in data center 230 is stored on central storage system 205. In an alternative embodiment, the application executed by a host device in data center 230 is stored in local storage of the host device.

Figure 3:
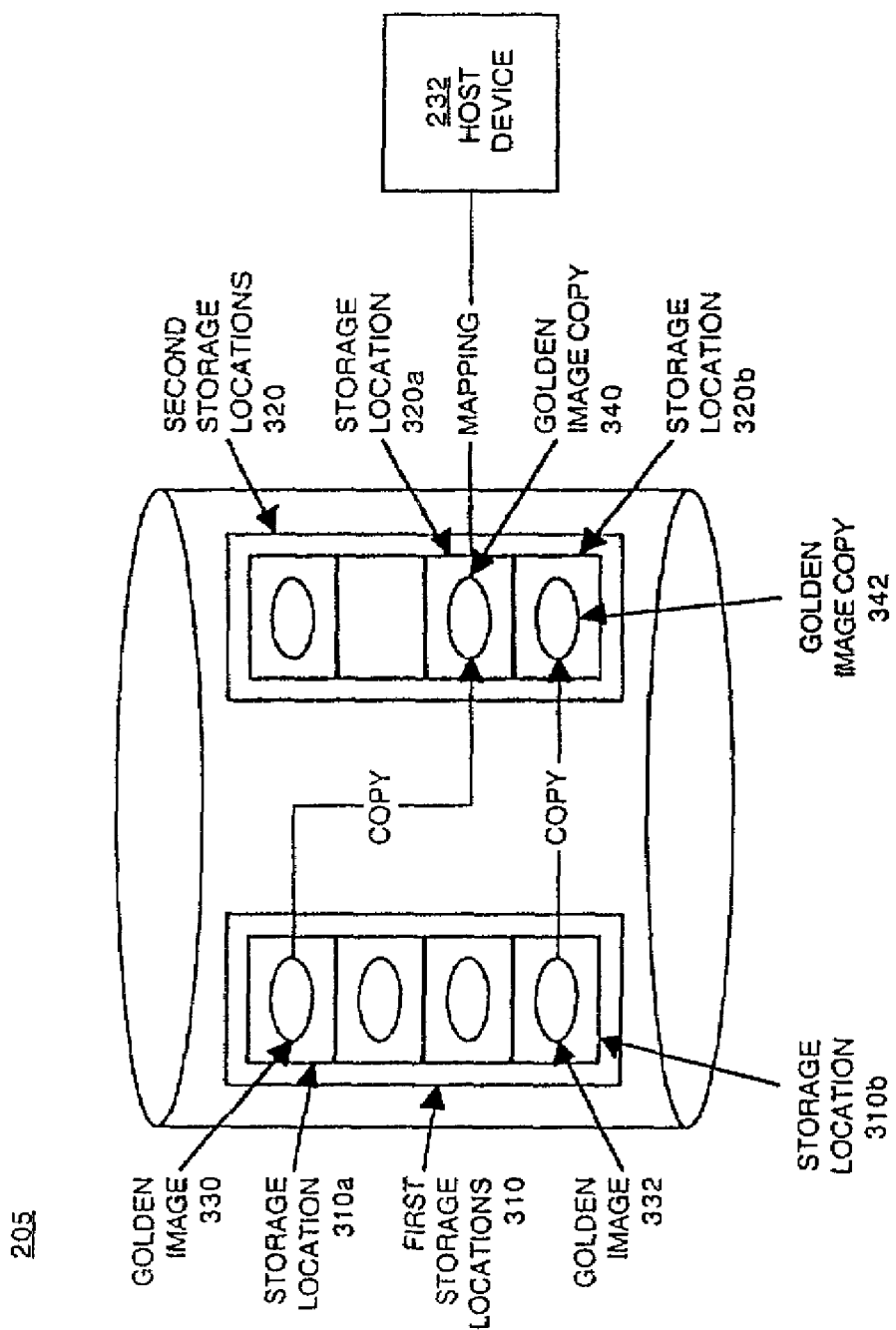
FIG. 3 is a data flow diagram of an exemplary central storage system upon which embodiments of the present invention may be implemented.

FIG. 3 is a data flow diagram of central storage system 205 upon which embodiments of the present invention may be implemented. In its essence, central storage system 205 includes a plurality of first storage locations 310 and a plurality of second storage locations 320.

In the present embodiment, the first storage locations 310 are for storing "golden images" of various applications. A golden image may exist for an application that has not been modified from an initial state, and a golden image may exist for each different version of the application as the application is modified from its initial state. That is, there is at first a source version of an application. When an application is to be set up so that it can be run using a host device, the source version of the application may be copied, and the copy modified so that it is configured according to the unique attributes of that host device. For example, the application may be configured for the particular operating system and operating system parameters used by the host device. That version of the application is thereby configured for any host device using that particular operating system and the same operating system parameters. The copy of the application, or a copy of the copy, may then be further modified so that it is configured for any parameters and attributes unique to a particular host device. For example, the application may be configured with the unique IP (Internet Protocol) address used by that device.

Thus, in the example above, the application exists in three states: an initial state that does not include any modifications, a second state that is configured for host devices having common attributes and parameters, and a third state that is unique to a particular host device. In one embodiment, a golden image is typically stored in central storage system 205 (specifically, in first storage locations 310) for the initial state and for the second state, but not for the third state.

Continuing with reference to FIG. 3, in the present embodiment, the second storage locations 320 can be mapped to the host devices 232, 234, 236 and 238 of FIG. 2. For example, storage location 320a may be mapped to host device 232. In this example, storage location 320a contains golden image copy 340, which is a copy of the golden image 330 residing in storage location 310a. Thus, host device 232, in communication with central storage system 205, can execute golden image copy 340.

In accordance with the present invention, a golden image (e.g., golden image 332) residing in one of the first storage locations 310 (e.g., storage location 310b) is copied, and the copy (e.g., golden image copy 342) is stored in one of the second storage locations 320. Specifically, golden image copy 342 is stored in one of the second storage locations 320 that is not yet mapped to a host device (e.g., in storage location 320b). According to the present invention, golden image copy 342 is made and stored in storage location 320b before a request for golden image 332 (or a request for the application represented by golden image 332) is received. Subsequently, when a request is received for golden image 332 (or for the application represented by golden image 332), the storage location 320b containing golden image copy 342 is mapped to the host device that needs the application.

All of the golden images in first storage locations 310, or some subset of the golden images, can be copied and stored in second storage locations 320. The decision whether or not to copy a particular golden image is made depending on anticipated demand for the golden image (or anticipated demand for the application represented by the golden image).

Figure 4:
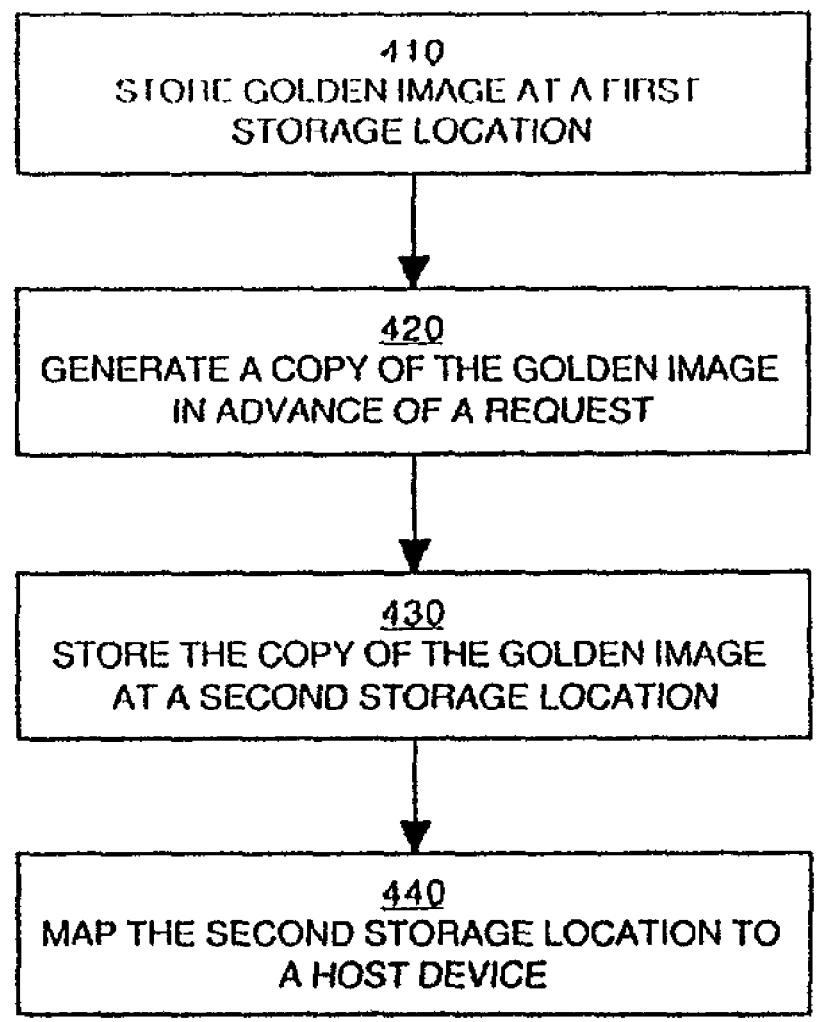
FIG. 4 is a flowchart of one embodiment of a process for provisioning a device with an application in accordance with the present invention.

FIG. 4 is a flowchart of one embodiment of a process 400 for provisioning a device with an application in accordance with the present invention. In one embodiment, process 400 is implemented by management host device 210 (FIG. 2) as computer-readable program instructions stored in a storage unit (e.g., ROM 108, RAM 106 or data storage device 110 of FIG. 1) and executed by a processor (e.g., processor 104 of FIG. 1).

In step 410 of FIG. 4, with reference also to FIG. 3, golden image 332 is stored at storage location 310b. In step 420, in advance of a request for golden image 332 (or for the application represented by golden image 332), a golden image copy 342 (a copy of golden image 332) is made. In step 430, golden image copy 342 is stored in storage location 320*b*. At this time in process 400, storage location 320*b* is not yet mapped to a host device (e.g., host device 232, 234, 236 or 238 of FIG. 2).

Continuing with reference to FIGS. 3 and 4, in step 440, in response to a request to provision a host device with the application represented by golden image 332, storage location 320*b* is mapped to the appropriate host device. The host device, in communication with central storage system 205 (FIG. 2), can then execute the application.

Therefore, in accordance with the present invention, instead of waiting for a request for a particular application to make a copy of the associated golden image, one or more copies are made in advance of the request. As stated above, the golden image copy is located in a storage location not yet mapped to a host device. To provision a host device with the application, the storage location containing the required golden image copy is mapped to that host device. Another copy of the golden image may then be made and stored in another storage location not yet mapped to a host device. By having at least one copy of a golden image on hand, provisioning time can be reduced to essentially zero.

Figure 5:
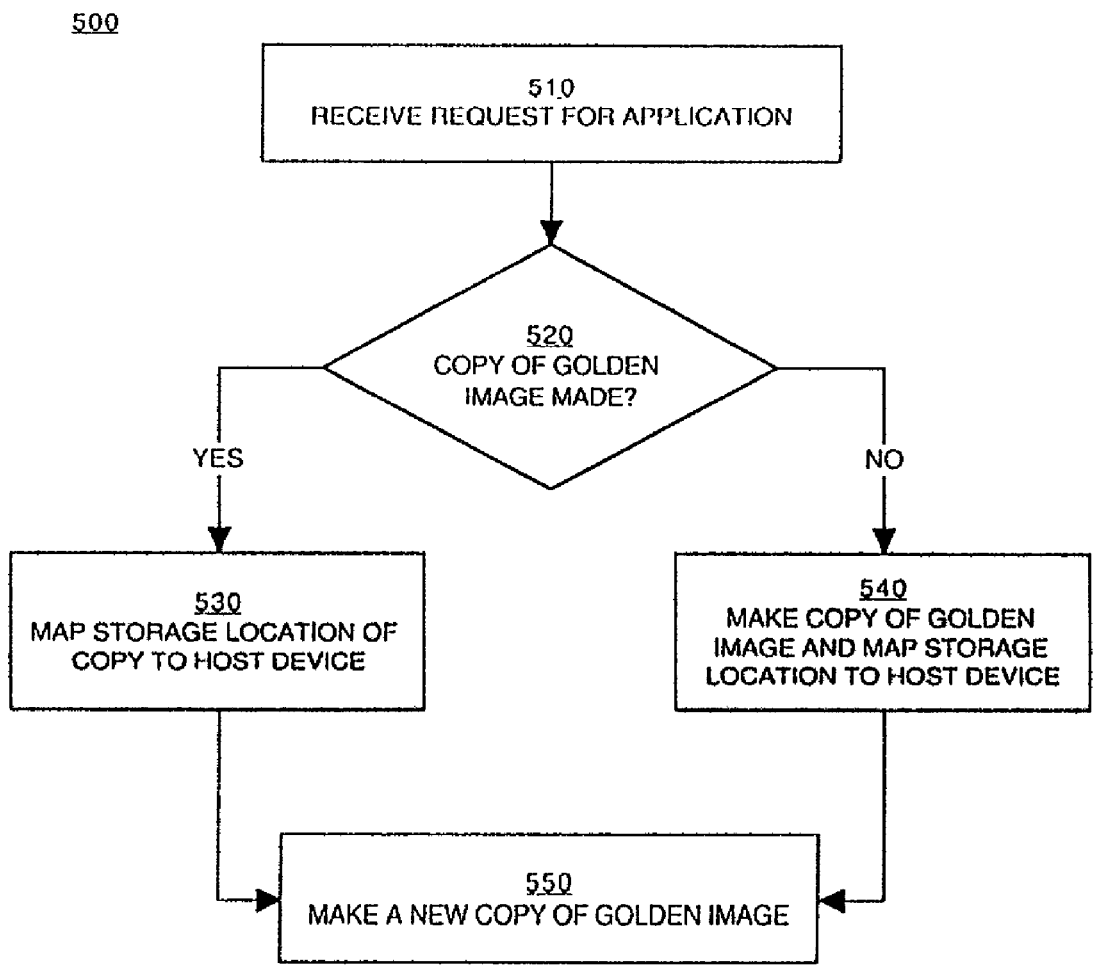
FIG. 5 is a flowchart of another embodiment of a process for provisioning a device with an application in accordance with the present invention.

FIG. 5 is a flowchart of one embodiment of a process 500 for provisioning a device with an application in accordance with the present invention. In one embodiment, process 500 is implemented by management host device 210 (FIG. 2) as computer-readable program instructions stored in a storage unit (e.g., ROM 108, RAM 106 or data storage device 110 of FIG. 1) and executed by a processor (e.g., processor 104 of FIG. 1).

In step 510 of FIG. 5, a request is received to provision a host device with a particular application. The request may instead be for the golden image representing the application. In step 520, the determination is made whether there is a copy of the golden image representing the application needed for the host device. If there is a copy, process 500 proceeds to step 530; otherwise, process 500 proceeds to step 540.

In step 530 of FIG. 5, with reference also to FIG. 3, a copy of the golden image (e.g., golden image copy 342) exists and is stored in a storage location 320*b* not yet mapped to a host device. Therefore, storage location 320*b* is mapped to the host device that needs to be provisioned with the application in question.

In step 540 of FIG. 5, with reference also to FIG. 3, first a copy of the golden image needs to be made and stored in a second storage location 320 not yet mapped to a host device, and then the selected storage location is mapped to the host device that needs to be provisioned with the application in question.

In step 550 of FIG. 5, another copy of the golden image can be made in anticipation of a future request. It is appreciated that more than one copy can be made if, for example, it is anticipated that copies might be needed on a more frequent basis, and in particular if requests are expected at a rate greater than the rate at which copies can be made. Using past experience, for example, a forecast can be made of how many copies of a particular golden image may be needed in the future.

In summary, the present invention provides a method and system that can reduce the time needed to provision a device with an application. By keeping more than one copy of each golden image that may be required, provisioning time can be reduced to essentially zero, thereby giving an application vendor using this approach a competitive advantage over other vendors. Clients can be serviced more quickly, and service can be provided to multiple customers at the same time. The time needed to copy a golden image does not hinder the provisioning of a host device with an application. The time needed to making copies of golden images can be shifted to slower periods when available resources are under-utilized.

The preferred embodiment of the present invention, method to reduce provisioning time in shared storage systems by preemptive copying of images, is thus described. While the present invention has been described in particular embodiments, it should be appreciated that the present invention should not be construed as limited by such embodiments, but rather construed according to the following claims.

What is claimed is:

1. In a central storage device, a method for provisioning a host device with an application, said method comprising:
   storing a golden image of said application at a first storage location in said central storage device, said golden image representing a source copy of said application, said golden image inaccessible to said host device and unchangeable while at said first storage location;
   generating a first copy of said golden image prior to receiving a request for said golden image;
   storing said first copy of said golden image at a second storage location in said central storage device, said golden image inaccessible to said host device and unchangeable by said host device while at said second storage location until said second storage location is mapped to said host device;
   mapping said second storage location to said host device that needs a copy of said golden image, wherein said host device is operable to execute said application in communication with said central storage device;
   generating a second copy of said golden image that is a copy of said first copy;
   configuring said second copy of said golden image according to attributes and parameters common to a plurality of host devices;
   storing said second copy at a third storage location in said central storage device, said second copy inaccessible to said host devices and unchangeable while at said third storage location;
   generating a third copy that is a copy of said second copy prior to receiving a request for said second copy;
   storing said third copy at a fourth storage location in said central storage device, said fourth storage location inaccessible to said host devices and unchangeable by said host devices while at said fourth storage location until said fourth storage location is mapped to one of said host devices; and
   mapping said fourth storage location to said one of said host devices, wherein said one of said host devices is operable to execute said application in communication with said central storage device.

2. The method as recited in claim 1 comprising:
   configuring said first copy of said golden image according to attributes of said host device.

3. The method as recited in claim 2 comprising:
   generating a copy of said first copy of said golden image, wherein said copy of said first copy comprises changes made during said configuring.

4. The method as recited in claim 1 comprising:
   forecasting when a request for a copy of said golden image is expected.

5. The method as recited in claim 4 further comprising:
   generating additional copies of said golden image based on results of said forecasting.

6. The method as recited in claim 1 comprising:
generating a new copy of said golden image subsequent to said mapping and prior to receiving another request for a copy of said golden image.

7. The method as recited in claim 1 wherein said host device is one device in a data center comprising said plurality of host devices and wherein said central storage device is a shared storage system, wherein storage locations in said shared storage system are each mapped to a respective host device in said data center.

8. A central storage device under control of a processor, said central storage device comprising:
a plurality of first storage locations for storing a plurality of golden images, wherein stored at a first storage location is a golden image of an application, wherein said golden image represents a source copy of said application and wherein said golden image is inaccessible to all other devices and is unchangeable while at said first storage location; and
a plurality of second storage locations coupled to said plurality of first storage locations;
wherein said processor executes a method for provisioning a host device with said application, said method comprising:
generating a first copy of said golden image prior to receiving a request for said golden image;
storing said first copy of said golden image at a second storage location, said golden image inaccessible to said other devices and unchangeable by said other devices while at said second storage location until said second storage location is mapped to a host device;
mapping said second storage location to said host device that needs a copy of said golden image, wherein said host device that needs said copy is operable to execute said application in communication with said central storage device;
generating a second copy of said golden image that is a copy of said first copy;
configuring said second copy of said golden image according to attributes and parameters common to a plurality of host devices;
storing said second copy at a third storage location in said central storage device, said second copy inaccessible to said host devices and unchangeable while at said third storage location;
generating a third a copy that is a copy of said second copy prior to receiving a request for said second copy;
storing said third copy at a fourth storage location in said central storage device, said fourth storage location inaccessible to said host devices and unchangeable by said host devices while at said fourth storage location until said fourth storage location is mapped to one of said host devices; and
mapping said fourth storage location to said one of said host devices, wherein said one of said host devices is operable to execute said application in communication with said central storage device.

9. The central storage device of claim 8 wherein said method comprises:
configuring said first copy of said golden image according to attributes of said host device requesting said copy of said golden image.

10. The central storage device of claim 9 wherein said method further comprises:
generating a copy of said first copy of said golden image, wherein said copy of said first copy comprises changes made during said configuring.

11. The central storage device of claim 8 wherein said method comprises:
forecasting when a request for a copy of said golden image is expected.

12. The central storage device of claim 11 wherein said method further comprises:
generating additional copies of said golden image based on results of said forecasting.

13. The central storage device of claim 8 wherein said method comprises:
generating a new copy of said golden image subsequent to said mapping and prior to receiving another request for a copy of said golden image.

14. The central storage device of claim 8 wherein said host device requesting said copy of said golden image is one device in a data center comprising said plurality of host devices and wherein said central storage device is a shared storage system, wherein said second storage locations are each mapped to a respective host device in said data center.

15. In a central storage device, a method for provisioning a host device with an application, said method comprising:
receiving a request to provision said host device with said application, said application stored as a golden image in a first storage location in said central storage device, said golden image inaccessible to said host device and unchangeable while at said first storage location;
determining whether a first copy of said golden image exists in a second storage location in said central storage device, said golden image inaccessible to said host device and unchangeable by said host device while at said second storage location until said second storage location is mapped to said host device;
mapping said second storage location to said host device when said first copy of said golden image exists, and otherwise generating a copy of said golden image in said second storage location and then mapping said second storage location to said host device, wherein said host device is operable to execute said application in communication with said central storage device;
generating a second copy of said golden image subsequent to said mapping and prior to receiving another request for a copy of said golden image;
generating a third copy of said golden image that is a copy of said second copy;
configuring said third copy of said golden image according to attributes and parameters common to a plurality of host devices;
storing said third copy at a third storage location in said central storage device, said third copy inaccessible to said host devices and unchangeable while at said third storage location;
generating a fourth copy that is a copy of said third copy prior to receiving a request for said third copy;
storing said fourth copy at a fourth storage location in said central storage device, said fourth storage location inaccessible to said host devices and unchangeable by said host devices while at said fourth storage location until said fourth storage location is mapped to one of said host devices; and
mapping said fourth storage location to said one of said host devices, wherein said one of said host devices is operable to execute said application in communication with said central storage device.

16. The method as recited in claim 15 comprising:
configuring said first copy of said golden image according to attributes of said host device.

17. The method as recited in claim 16 comprising:
generating a copy of said first copy of said golden image, wherein said copy of said first copy comprises changes made during said configuring.

18. The method as recited in claim 15 comprising:
forecasting when a request for a copy of said golden image is expected.

19. The method as recited in claim 18 further comprising:
generating additional copies of said golden image based on results of said forecasting.

20. The method as recited in claim 15 wherein said host device is one device in a data center comprising said plurality of host devices and wherein said central storage device is a shared storage system, wherein storage locations in said shared storage system are each mapped to a respective host device in said data center.

* * * * *

UNITED STATES PATENT AND TRADEMARK OFFICE
CERTIFICATE OF CORRECTION

| | |
|---|---|
| PATENT NO. | : 7,350,206 B2 |
| APPLICATION NO. | : 10/011378 |
| DATED | : March 25, 2008 |
| INVENTOR(S) | : Sharad Singhal |

It is certified that error appears in the above-identified patent and that said Letters Patent is hereby corrected as shown below:

In column 9, line 49, in Claim 8, after "third" delete "a".

Signed and Sealed this

Fifteenth Day of July, 2008

JON W. DUDAS
*Director of the United States Patent and Trademark Office*